US011909799B2

United States Patent
Kim et al.

(10) Patent No.: US 11,909,799 B2
(45) Date of Patent: Feb. 20, 2024

(54) MEDIA PLAYBACK APPARATUS AND METHOD INCLUDING DELAY PREVENTION SYSTEM

(71) Applicant: HANWHA TECHWIN CO., LTD., Seongnam-si (KR)

(72) Inventors: Do Hyun Kim, Chanwon-si (KR); Chang Hee Song, Chanwon-si (KR); Byung In Song, Chanwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 110 days.

(21) Appl. No.: 17/218,996

(22) Filed: Mar. 31, 2021

(65) Prior Publication Data

US 2021/0218788 A1 Jul. 15, 2021

Related U.S. Application Data

(62) Division of application No. 15/845,152, filed on Dec. 18, 2017, now Pat. No. 10,992,724.

(30) Foreign Application Priority Data

Jan. 20, 2017 (KR) .................. 10-2017-0009963
Jul. 11, 2017 (KR) .................. 10-2017-0087666

(51) Int. Cl.
*H04L 65/75* (2022.01)
*H04L 65/1069* (2022.01)
(Continued)

(52) U.S. Cl.
CPC .......... *H04L 65/75* (2022.05); *H04L 65/1069* (2013.01); *H04L 65/764* (2022.05);
(Continued)

(58) Field of Classification Search
CPC ......... H04L 67/02; H04L 65/65; H04L 65/75; H04L 65/1069; H04L 65/764; H04L 65/80; H04L 65/60
See application file for complete search history.

(56) References Cited

U.S. PATENT DOCUMENTS

| 6,859,460 | B1 | 2/2005 | Chen |
| 2003/0014705 | A1* | 1/2003 | Suzuki ............. H04N 21/64322 375/E7.199 |

(Continued)

FOREIGN PATENT DOCUMENTS

| KR | 1020050098461 A | 10/2005 |
| KR | 1020130138143 A | 12/2013 |

(Continued)

OTHER PUBLICATIONS

Communication dated Jun. 5, 2018, issued by the Korean Intellectual Property Office in counterpart Korean Application No. 10-2017-0087666.

*Primary Examiner* — Michael Won
(74) *Attorney, Agent, or Firm* — Sughrue Mion, PLLC

(57) ABSTRACT

A media playback apparatus and a method including a system for preventing a playback delay are provided. The media playback apparatus may include a delay detecting module to detect a playback delay. The playback delay detection may determine a delay caused by a network, decoding and rendering through a single measurement. When the playback delay occurs, it may be possible to eliminate the playback delay by requesting that a server provide media data having a changed profile. Since the playback delay can be determined through a single measurement of a plurality of playback delay factors, it may be possible to simply and stably perform media playback in a manner suitable for a non-plug-in environment.

12 Claims, 10 Drawing Sheets

Related U.S. Application Data

(60) Provisional application No. 62/457,203, filed on Feb. 10, 2017.

(51) Int. Cl.
*H04L 65/80* (2022.01)
*H04L 67/02* (2022.01)
*H04L 65/65* (2022.01)

(52) U.S. Cl.
CPC .............. *H04L 65/80* (2013.01); *H04L 65/65* (2022.05); *H04L 67/02* (2013.01)

(56) References Cited

U.S. PATENT DOCUMENTS

| | | | | |
|---|---|---|---|---|
| 2006/0034581 A1* | 2/2006 | Konetski | ......... | H04N 21/43615 348/E5.002 |
| 2008/0117930 A1* | 5/2008 | Chakareski | ........... | H04L 1/0002 370/465 |
| 2011/0246616 A1* | 10/2011 | Ronca | ................ | H04N 21/6587 709/219 |
| 2012/0178380 A1 | 7/2012 | Fleck et al. | | |
| 2013/0163579 A1* | 6/2013 | Yadav | .................. | H04L 65/765 370/352 |
| 2014/0179377 A1 | 6/2014 | Song et al. | | |
| 2015/0281288 A1* | 10/2015 | Levinson | ................ | H04L 47/41 709/219 |
| 2016/0248833 A1 | 8/2016 | Hiltch et al. | | |
| 2016/0285948 A1* | 9/2016 | Saint-Hilaire | .......... | H04L 65/65 |
| 2017/0223423 A1* | 8/2017 | Hardy | ............. | H04N 21/64322 |
| 2018/0103261 A1 | 4/2018 | Sun et al. | | |

FOREIGN PATENT DOCUMENTS

| | | |
|---|---|---|
| KR | 10-2014-0000914 A | 1/2014 |
| KR | 10-1358802 B1 | 2/2014 |
| KR | 10-2014-0091021 A | 7/2014 |
| WO | 2016/137989 A1 | 9/2016 |

\* cited by examiner

MEDIA PLAYBACK APPARATUS AND METHOD INCLUDING DELAY PREVENTION SYSTEM

CROSS-REFERENCE TO THE RELATED APPLICATIONS

This is a divisional application of U.S. application Ser. No. 15/845,152, filed Dec. 18, 2017, which claims priority from U.S. Provisional Application No. 62/457,203 filed on Feb. 10, 2017 and Korean Patent Application Nos. 10-2017-0009963 filed on Jan. 20, 2017 and 10-2017-0087666 filed on Jul. 11, 2017 in the Korean Intellectual Property Office, the disclosures of which are incorporated herein by reference in their entireties.

BACKGROUND

Technical Field

Apparatuses and methods consistent with exemplary embodiments relate to playing back media on a web browser, and more particularly, to a media playback apparatus and method for determining and preventing a network delay.

2. Description of the Related Art

In order for a user to play back media data on a web browser through the Internet, there is provided a method of using a plug-in in which a codec, a decoder, a renderer and the like are written in native code. As representative examples of web browser plug-ins, ActiveX and Netscape Plugin Application Programming Interface (NPAPI) are widely used.

ActiveX was developed by Microsoft using a combination of two technologies: Component Object Model (COM) and Object Linking and Embedding (OLE). However, in a narrow sense, it refers to an ActiveX control used in the form of an add-on in Internet Explorer which is a web browser. ActiveX is used to play media in the Internet Explorer web browser.

NPAPI is an application programming interface (API) developed for Netscape browsers, and is similar in functionality to ActiveX of Internet Explorer. NPAPI is an API provided for using an external application program in a plug-in format in order to enhance the function of a web browser, and was used primarily for the web environment in its embryonic stage. In other words, it was developed to play music and videos on early web pages. For example, there are Java Applet, Adobe Flash, Real Player and the like.

However, since a plug-in is used by hackers as a way to distribute malicious code, web browsers no longer support the plug-in. In the case of NPAPI, Google, which produces and distributes Chrome, no longer supports NPAPI after the release of Chrome version 45. In the case of ActiveX, Microsoft no longer supports ActiveX after the release of Edge version, which is used as a default browser for Windows 10.

As a method for playing back media on a web browser without a plug-in, t decoding is performed based a video tag of Hypertext Markup Language 5 (HTML5). When decoding is performed using a video tag, high resolution video and high fps video can be processed with excellent performance. However, there are restrictions on the video formats supported by a video tag and it currently supports only three formats: MP4, WebM, and Ogg.

The drawback of the video tag due to the restrictions on the codec formats can be alleviated by using a decoder implemented in JavaScript. Since a JavaScript decoder can perform decoding according to a video format, it is possible to decode media of a codec format not supported by a video tag. Accordingly, in the present disclosure, a media playback apparatus is configured to selectively use a video tag and a JavaScript decoder according to a video codec format.

In the media playback on a web browser, a media playback delay should be taken into consideration in addition to a plug-in. The playback delay may cause inconvenience to the user, and may adversely affect a playback environment for real-time live video playback and video surveillance in which real-time information transmission is very important.

A first delay factor of media playback in a web browser is a delay due to the network. In an environment where the use of mobile devices is rapidly increasing, a network delay due to network bandwidth and poor performance of a computing device becomes a main factor of the playback delay. A second delay factor is a delay that may occur when a decoder is implemented in JavaScript. Due to the dynamic nature of JavaScript, in high resolution video, the performance of the JavaScript decoder may drop dramatically, thereby resulting in a playback delay. A third delay factor is a delay due to rendering. A rendering delay may occur depending on the performance of a computing device, for example, when a central processing unit (CPU) or graphic processing unit (GPU) cannot handle the amount of computation required for rendering.

Conventionally, as a playback delay determination method, a delay time has been measured in each step of networking, decoding and rendering and synthesizing. The delay time in each step is calculated by calculating a time difference between when the media is inputted and when the media is outputted in each step. However, this method requires measuring a delay in every other step in addition to the above-mentioned network, decoding and rendering, and is not suitable for a media playback apparatus in a non-plug-in environment in which it should be written in clean and lightweight code.

Therefore, it may be necessary to devise a playback delay determination method suitable for a non-plug-in environment and a delay eliminating method in playing back video on a web browser.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a method for determining a delay of media playback by one measurement in an environment in which media is played back on a web browser having a plurality of delay factors such as a network delay, a decoding delay and a rendering delay.

Further, one or more exemplary embodiments provide a media playback delay determination method suitable for a non-plug-in environment.

According to an aspect of an exemplary embodiment, there is provided a media playback apparatus for playing back media on a web browser, including at least one processor to implement: a receiving unit configured to receive media data generated in a media service apparatus using a communication protocol which supports web services; a first media restoring unit configured to decode the received media data by a decoder written in a script, the script being configured to be parsed by the web browser; a renderer configured to perform rendering to display the media data decoded by the decoder; a delay detecting unit configured to detect a playback delay of the media data by comparing a time stamp included in the media data with a time at which the media data arrive at the media restoring unit; and a profile changing unit configured to request the media service apparatus to transmit the media data having a changed profile in response to the delay detecting unit detecting the playback delay.

According to an aspect of another exemplary embodiment, there is provided a media service apparatus for transmitting media data to a media playback apparatus, the media service apparatus including: a module storage unit configured to store a script module to play back the media data on a web browser of the media playback apparatus; and at least one processor to implement: a module transmitting unit configured to transmit the script module to the media playback apparatus in response to a connection between the media service apparatus and the media playback apparatus being established; a packetizing unit configured to packetize the media data to generate a transmission packet; and a web server configured to establish the connection and transmit the transmission packet to the media playback apparatus in response to a requested profile being received from the media playback apparatus, wherein the script module configured to decode the media data without a plug-in in the media playback apparatus, and detect a playback delay occurring during playback of the media data.

According to the exemplary embodiment, it may be possible to prevent a media playback delay due to the dynamic nature of JavaScript even though a decoder implemented in JavaScript is used. Therefore, the user can play back the media without a stutter in video, and the present disclosure is very useful in an environment where a video tag cannot be used due to the restrictions on the codec formats.

Also, according to the exemplary embodiment, a delay due to a plurality of delay factors such as a network delay, a decoding delay and a rendering delay can be determined by a single measurement. Therefore, it may be possible to simply and stably perform media playback in a manner suitable for a non-plug-in environment.

BRIEF DESCRIPTION OF THE DRAWINGS

The above and other aspects will be more apparent by describing certain exemplary embodiments with the attached accompanying drawings, in which.

DETAILED DESCRIPTION

Figure 1:
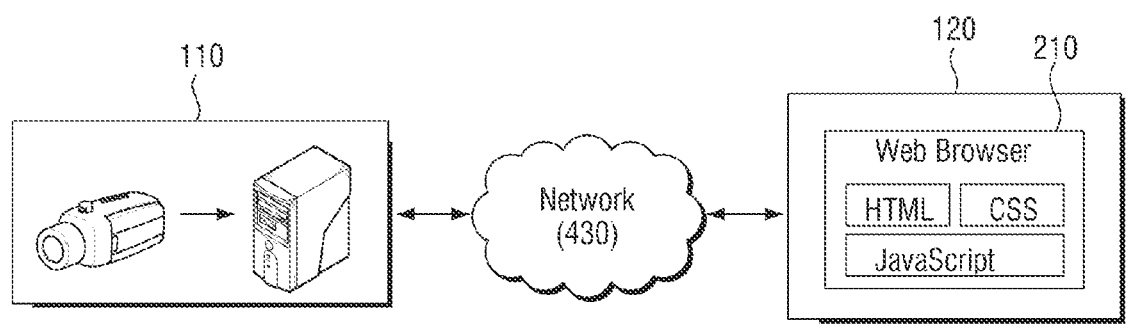
FIG. 1 shows a system for media playback according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated components, but do not preclude the presence or addition of one or more other components.

Expressions such as "at least one of," when preceding a list of elements, modify the entire list of elements and do not modify the individual elements of the list.

FIG. 1 illustrates a system for playing back and seeking media according to an exemplary embodiment. The system shown in FIG. 1 includes a media service apparatus 110, a media playback apparatus 120, and a network 430 connecting the two apparatuses 110 and 120.

The media service apparatus 110 includes a computing or processing device suitable for providing computing services to one or more video playback apparatuses. For example, the media service apparatus 110 includes a device, such as a network camera, a network video recorder (NVR) and a digital video recorder (DVR), capable of generating or storing a video stream and transmitting the video stream to user devices. The media service apparatus 110 may be also referred to as a media service system, in which a server and a network camera are included.

The media playback apparatus 120 includes a computing or processing device suitable for interacting with the media service apparatus 110 or other computing user devices via the network 430. For example, the media playback apparatus 120 may include a desktop computer, a mobile phone or smart phone, a personal digital assistant (PDA), a laptop computer and a tablet computer.

The media captured or stored in real time by the media service apparatus 110 is transmitted through the network 430 at the request of the media playback apparatus 120. The user can play back or seek the media transmitted through a user interface implemented on a web browser 210 of the media playback apparatus 120. In particular, the web browser 210 may include a commonly known browser such as Google Chrome, Microsoft Explorer, Mozilla Firefox and Apple Safari installed on a desktop computer or mobile phone, and may also include software applications that are created separately using application programing interfaces (APIs) or resources of the web browser.

Hereinafter, a real time streaming protocol (RTSP) and/or real-time transport protocol (RTP) streams that are transmitted through a WebSocket protocol will be described with reference to FIG. 2 to FIG. 5. The WebSocket may be used as a network communication scheme between the media service apparatus 110 and the media playback apparatus 120.

Figure 2:
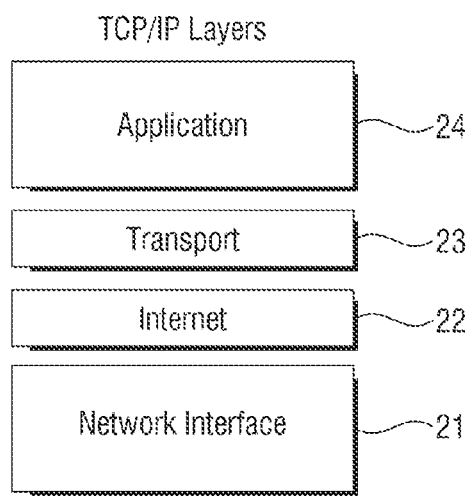
FIG. 2 is a diagram illustrating a TCP/IP 4-layer model that is hierarchically defined for communication between devices.

FIG. 2 is a diagram illustrating a transmission control protocol/internet protocol (TCP/IP) 4-layer model that is hierarchically defined for communication between devices. The four layers include a network interface layer 21, an Internet layer 22, a transport layer 23 and an application layer 24. Since the WebSocket enables transmission of messages on top of the transport layer 23, in order to use the WebSocket connection, a TCP transport connection may have to be first established between the media service apparatus 110 and the media playback apparatus 120. Once the WebSocket connection is established between the media service apparatus 110 and the media playback apparatus 120, for example, via a 3-way handshake process, the WebSocket communication is performed by transmitting WebSocket packets. The WebSocket connection and the WebSocket packet will be described in detail with reference to FIGS. 3 to 5 below.

Figure 3:
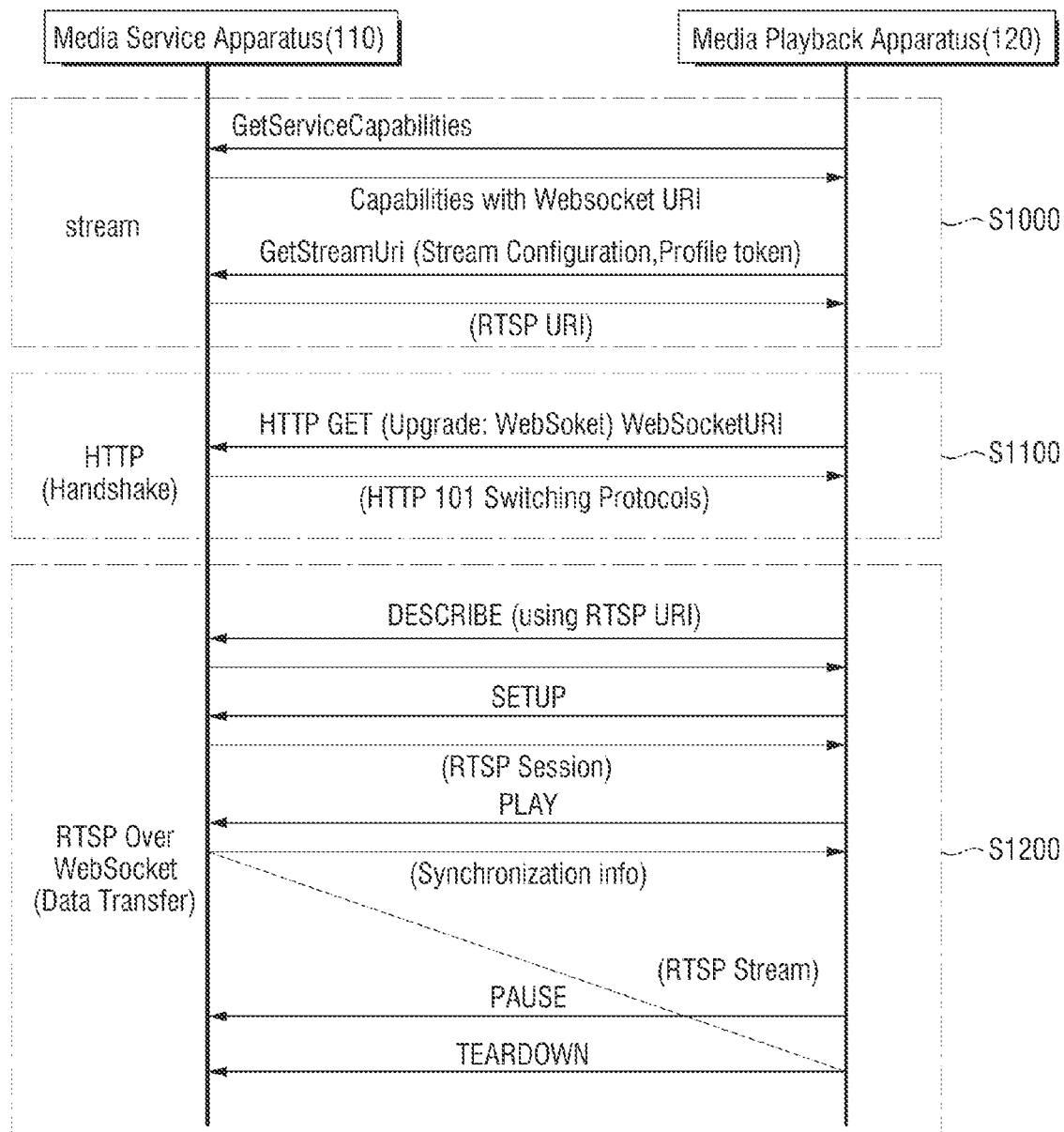
FIG. 3 shows a process of performing a WebSocket connection between a media service apparatus and a media playback apparatus.

FIG. 3 shows a process of performing a WebSocket connection between the media service apparatus 110 and the media playback apparatus 120. The media playback apparatus 120 requests the media service apparatus 110 to initiate a WebSocket connection using a WebSocket URI. The WebSocket URI may be obtained using a command of GetServiceCapabilities. The WebSocket URI is expressed, for example, as "ws://192.168.0.5/webSocketServer" (operation S1000).

The media playback apparatus 120 may transmit a WebSocket upgrade request to the media service apparatus 110. The media service apparatus 120 may respond with code 101, which is a status code to approve a protocol change request (operation S1100).

After the WebSocket connection is established between the media service apparatus 110 and the media playback apparatus 120, data is exchanged through the RTSP/RTP protocol transmitted over a WebSocket instead of a hypertext transfer protocol (HTTP)/1.1 protocol. DESCRIBE, SETUP, PLAY, PAUSE and TEARDOWN in FIG. 3 are RTSP commands. A DESCRIBE request includes a uniform resource locator (URL). A response message to DESCRIBE also includes a description of the request. A SETUP request specifies whether a single media stream should be transmitted. A PLAY request is a request to play one or all media streams, and multiple requests are possible. A PAUSE request is a command to pause the playback of one or all media streams. The playback may be restarted in response to a PLAY request. A TEARDOWN request is a command to terminate a session. The playback of all the media streams may be stopped by the TEARDOWN request and all sessions related to the data are also released (operation S1200).

An example of a request message sent from the media playback apparatus 120 and a response message of the media service apparatus 110 in the WebSocket connection process shown in FIG. 3 is provided in Table 1 as follows.

TABLE 1

Media Playback Apparatus 120 -> Media Service Apparatus 110

GET /webSocketServer HTTP/1.1
Host: 192.168.0.1
Upgrade: websocket
Connection: Upgrade
Sec-WebSocket-Key: dGhlIHNhbXBsZSBub25jZQ= =
Origin: http://example.com
Sec-WebSocket-Protocol: rtsp.onvif.org
Sec-WebSocket-Version: 13.

Media Service Apparatus 110 -> Media Playback Apparatus 120

HTTP/1.1 101 Switching Protocols
Upgrade: websocket
Connection: Upgrade
Sec-WebSocket-Accept: s3pPLMBiTxaQ9kYGzzhZRbK+xOo=
Sec-WebSocket-Protocol: rtsp.onvif.org This WebSocket connection is made according to a WebSocket protocol that follows the HTML5 standard. In particular, since the WebSocket connection continuously supports bidirectional communication, data can be continuously transmitted and received between the media service apparatus 110 and the media playback apparatus 120 without being disconnected.

Figure 4:
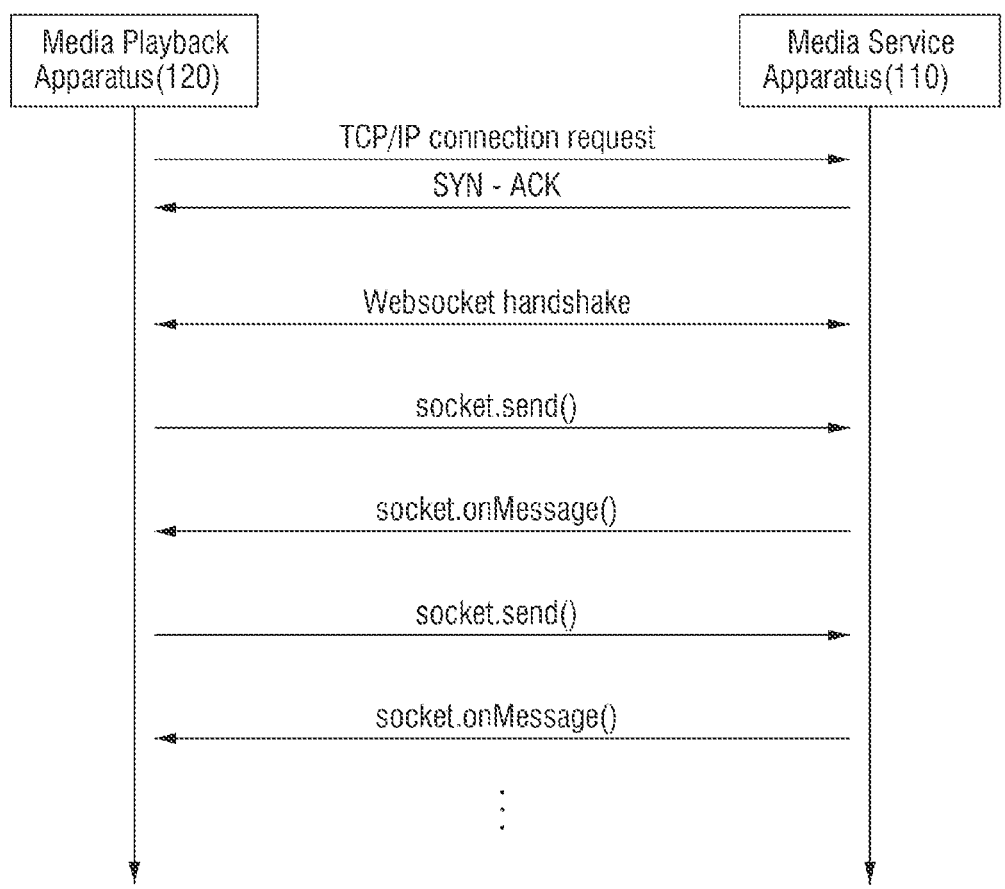
FIG. 4 shows an example of a process of transmitting and receiving data through a WebSocket connection.

FIG. 4 shows an example of a process of transmitting and receiving data through a WebSocket connection. Referring to FIG. 4, first, the media playback apparatus 120 transmits a TCP/IP connection request message to the media service apparatus 110, and the media service apparatus 110 accepts it and transmits a TCP response message (SYN-ACK) to the media playback apparatus 120, thereby establishing a TCP/IP connection. A TCP transport connection may be formed by a pair of a local TCP socket and a remote TCP socket. Each TCP socket is defined by at least an identifier such as a port number and an IP address. A user diagram protocol (UDP)/IP-based connection may be established between the media playback apparatus 120 and the media service apparatus 110 instead of the TCP/IP-based connection.

Then, when the WebSocket connection is established through a handshake process between the media playback apparatus 120 and the media service apparatus 110, continuous data transmission/reception between them can be performed thereafter. That is, the media playback apparatus 120 transmits a media streaming request to the media service apparatus 110 in the form of a transmission WebSocket packet (socket.send), and the media service apparatus 110 transmits a media stream to the media playback apparatus 120 in the form of a response WebSocket packet (socket.onMessage). This process can be performed continuously between the media playback apparatus 120 and the media service apparatus 110 until media stream transmission is stopped or completed.

Figure 5:
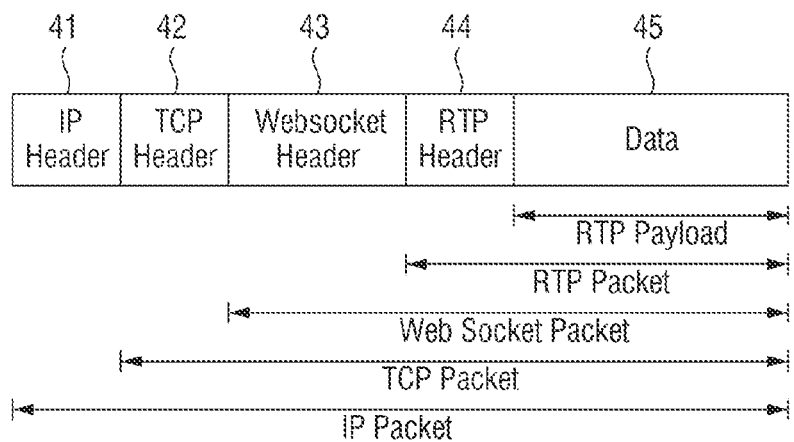
FIG. 5 is a diagram illustrating a structure of a communication packet transmitted through a network interface.

FIG. 5 is a diagram illustrating a structure of a communication packet transmitted through the network interface 21. When an RTP header 44 is added to an RTP payload corresponding to data 45, the RTP payload becomes an RTP packet. The RTP packet may be equal to a WebSocket payload, and a WebSocket header 43 may be added to the RTP packet to become a WebSocket packet. The WebSocket packet may be equal to a TCP payload, and a TCP header 42 is added to the WebSocket packet to become a TCP packet. Finally, the TCP packet is equal to an IP payload, and an IP header 41 is added to the TCP packet, thereby completing a communication packet, that is, an IP packet. The process of completing the IP packet and a process of removing each header are performed in both the media service apparatus 110 and the media playback apparatus 120.

Since the communication between the media service apparatus 110 and the media playback apparatus 120 is performed through a HTML5-based WebSocket protocol, a module that performs RTSP/RTP transmission/reception control and a decoder may be implemented by script code that can be parsed in HTML5. Accordingly, media playback using the RTSP/RTP protocol can be implemented in a web browser of the HTML5 environment without separately installing a plug-in as in a conventional case.

The network communication scheme between the media service apparatus 110 and the media playback apparatus 120 has been described so far. Hereinafter, a configuration and operation method of the media service apparatus 110 and the media playback apparatus 120 will be described with reference to FIGS. 6 to 15.

Figure 6:
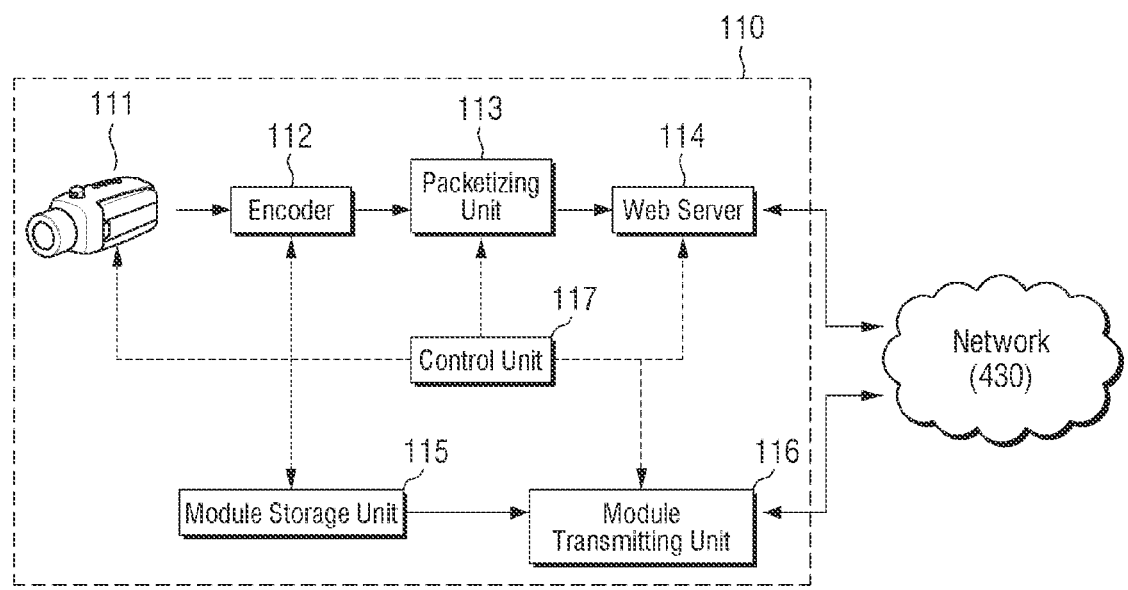
FIG. 6 shows a configuration of the media service apparatus according to an exemplary embodiment.

FIG. 6 shows a configuration of the media service apparatus 110 according to an exemplary embodiment. In one exemplary embodiment, the media service apparatus 110 includes a real-time video camera 111, an encoder 112, a packetizing unit 113, a web server 114, a module storage unit 115, a module transmitting unit 116, and a control unit 117. The encoder 112, the packetizing unit 113, and the control unit 117 may be included in one or more processors.

The real-time video camera 111 may capture images in real time, and the capturing includes a case of performing both video capturing and audio recording and a case of performing only video capturing. Hereinafter, a case of performing only video capturing in the real-time video camera 111 will be described as an example.

The encoder 112 is configured to compress and encode the media captured by the real-time video camera 111. The encoding of the encoder 112 is not necessarily performed using a specific codec supported by a decoder embedded in the web browser, but may be performed in an arbitrary codec format.

The packetizing unit 113 packetizes the encoded media data to generate a transmission packet. The packetization may be performed by dividing the video into appropriate lengths to facilitate transmission via the network 430, or collectively assigning control information, such as a receiving address, to each data in an appropriate length if the video is short. In this case, the control information is located in the header of the packet. The transmission packet is in the form of the above-described WebSocket packet.

The packetizing unit 113 may perform packetization of the video according to a method requested by the media playback apparatus 120. The media playback apparatus 120, which will be described in an embodiment of FIG. 12, includes a JavaScript decoder as a decoder written in a script that can be parsed by a web browser, and a video tag decoder as a decoder embedded in a web browser. A decoder may be selectively used according to factors such as playback of real-time video, playback of stored video, codec format of video, and the like. As will be described later with reference to FIG. 12, the JavaScript decoder performs decoding on a frame-by-frame basis, and the video tag decoder performs decoding on a container-by-container basis. Accordingly, the media playback apparatus 120 may request the transmission packet in a container or frame format from the packetizing unit 113 according to a decoder for performing decoding, and the packetizing unit 113 may perform packetization in response thereto.

The web server 114 establishes a communication session with the media playback apparatus 120. For example, a WebSocket connection may be established between the web server 114 of the media service apparatus 110 and the media playback apparatus 120 through a handshake process between them. Thereafter, according to the request of the media playback apparatus 120, the transmission packet generated by the packetizing unit 113 is transmitted through the web server 114.

The module storage unit 115 may store a script module necessary to play back and seek video in the media playback apparatus 120. The script module is a module, which allows the media playback apparatus 120 to play back video in a web browser in an HTML5 environment without installing a plug-in or a separate application program, as code written in a script that can be parsed by a web browser. The script module may be code written in JavaScript in one embodiment. The script module will be described later with reference to FIGS. 8 and 9.

The module transmitting unit 116 may transmit the script module stored in the module storage unit 115 to the media playback apparatus 120. The module transmitting unit 116 transmits the script module in response to a connection being established between the media playback apparatus 120 and the media service apparatus 110 via the network 430.

The control unit 117 may control other configuration modules in the media service apparatus 110. For example, when the media playback apparatus 120 connects to the web server 114 through the network 430, the script module stored in the module storage unit 115 is transmitted to the media playback apparatus 120 through the module transmitting unit 116. In this case, the control unit 117 sends/receives signals to/from the respective modules to control the operation to be performed smoothly.

The operation method will be described based on the description of the configuration modules of the media service apparatus 110 of FIG. 6. When the media playback apparatus 120 is connected to the web server 114 via the network 430, the module transmitting unit 116 transmits the script module stored in the module storage unit 115 to the media playback apparatus 120. When the script module is installed in the media playback apparatus 120, the user requests media playback through the user interface. Accordingly, the media service apparatus 110 encodes the real-time live media captured by the real-time video camera 111 in the encoder 112 and packetizes the media data into transmission packets in accordance with the frame or container format in the packetizing unit 113, and transmits them to the media playback apparatus 120 via the web server 114.

Figure 7:
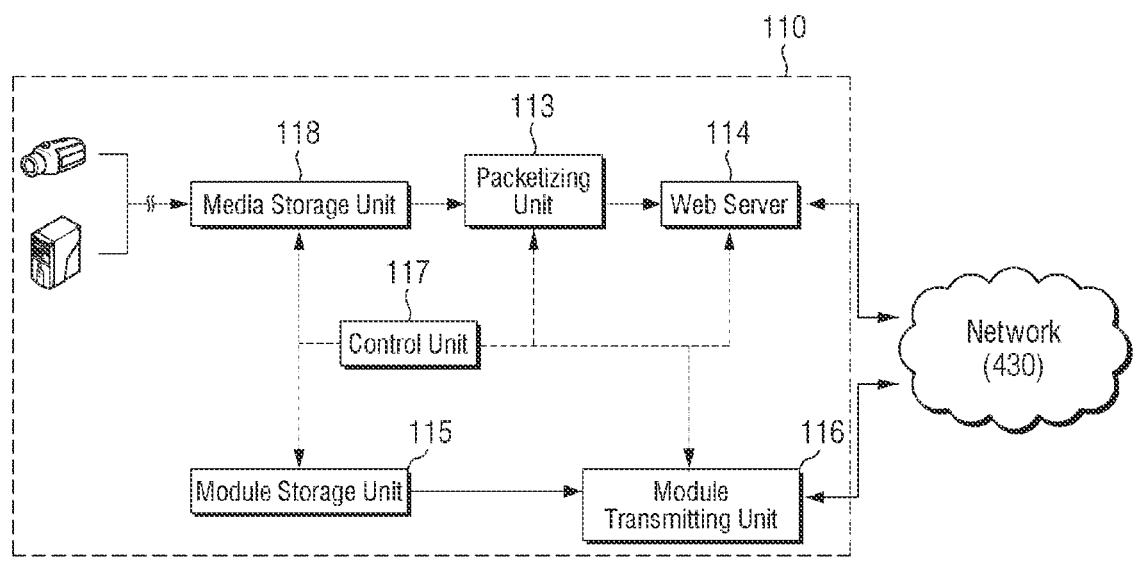
FIG. 7 shows a configuration of the media service apparatus according to another exemplary embodiment.

FIG. 7 shows a media service apparatus 110 according to another exemplary embodiment. The media service apparatus 110 of FIG. 6 represents an embodiment for transmitting real-time live video using the real-time video camera 111, and the media service apparatus 110 of FIG. 7 represents an embodiment for transmitting video stored in a media storage unit 118.

The media storage unit 118 includes a network video recorder (NVR) or a personal video recorder (PVR). However, FIG. 7 will be described in conjunction with the network video recorder. The media storage unit 118 receives video from a camera or a server and compresses and stores the received video. When there is a request for transmission of the stored video from the media playback apparatus 120, the media service apparatus 110 packetizes the media data stored in the media storage unit 118 in the packetizing unit 113 and transmits the packetized data through the web server 114. The packetizing unit 113, the web server 114, the module storage unit 115, the module transmitting unit 116 and the control unit 117 among the configuration modules of the media service apparatus 110 have been described with reference to FIG. 6, and thus, a redundant description thereof will be omitted.

Figure 8:
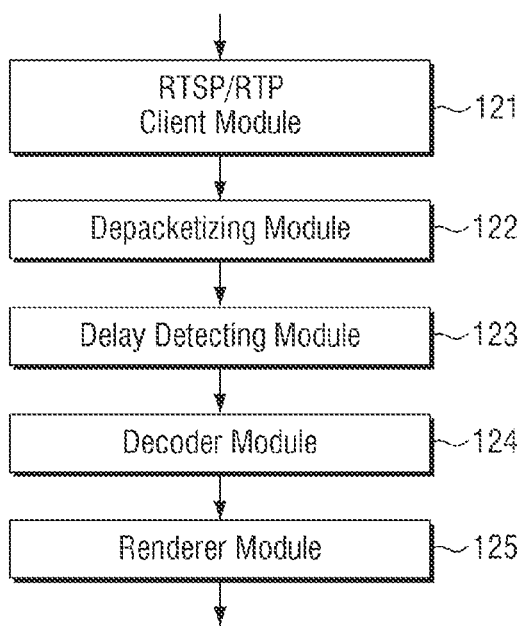
FIG. 8 shows a script module of a module storage unit according to an exemplary embodiment.

FIG. 8 shows a script module of the module storage unit 115 according to an exemplary embodiment.

The script module of FIG. 8 includes an RTSP/RTP client module 121, a depacketizing module 122, a delay detecting module 123, a decoder module 124, and a renderer module 125. In the embodiment of FIG. 8, the script module is implemented in JavaScript which is a script that can be parsed by a web browser.

The RTSP/RTP client module 121 is configured to support RTSP/RTP communication with the media service apparatus 110. In related art, it may be impossible to process media data according to the RTSP/RTP protocol on a web browser without a plug-in. According to the present exemplary embodiment, the RTSP/RTP client module 121 may allow to reliably receive data transmitted through the RTSP/RTP protocol even if the web browser uses a HTTP scheme.

The depacketizing module 122 may depacketize a packet transmitted from the RTSP/RTP client module 121. The depacketization is an opposite operation of packetization. If the packetization is performed by dividing media data into pieces having appropriate lengths to form packets, the depacketization may be performed by restoring the media data to a state prior to the packetization by putting the pieces (i.e., packets) together again.

The delay detecting module 123 may determine whether video playback is delayed. In particular the delay detecting module 123 may determine a type of a delay, including a delay of video playback due to a plurality of factors such as a delay caused by the network between the media service apparatus 110 and the media playback apparatus 120, a decoding delay caused by the decoder module 124 and a rendering delay caused by the renderer module 125, through one measurement. The detailed description thereof will be given later with reference to FIG. 11.

The decoder module 124 may decompress the encoded media data to decode the encoded media data. The decoder module 124 is implemented in JavaScript similarly to other modules of the script module. Since the decoder module 124 is implemented in JavaScript, unlike the decoder embedded in the web browser, it may be possible to perform decoding in an arbitrary codec format without limitation to the codec format. It may be also possible to perform decoding on a frame-by-frame basis.

If the decoder module 124 is implemented in JavaScript according to the embodiment of FIG. 8, the decoder module 124 may be represented by the code shown in the following Table 2, for example.

TABLE 2

```
function HevcDecoder ( ) {
    var _name = "HevcDecoder";
    var self = this;
    this._decoderParameters = null;
    this._isRequestActive = false;
    this._player = null;
    this._requestContext = null;
    this._requestContextQueue = [ ];
    this.pushRequestContext = function (requestContext) {
        self._requestContextQueue.push(requestContext);
    };
    this.decode = function ( ) {
        if (self._isRequestActive) {
            return;
```

TABLE 2-continued

```
        }
        if (self._requestContextQueue.length) {
            self._isRequestActive = true;
            self._requestContext = self _requestContextQueue.pop( );
            self._playStream(self._requestContext.stream);
        }
    };
    this._createDecodeCanvas = function(parentElement) {
        self.canvas = document.createElement("canvas");
        self.canvas.style.display = "none";
        self.canvas.id = "decode-canvas";
        parentElement.appendChild(self.canvas);
        self.ctx = self.canvas.getContext("2d");
    };
    this._playStream = function (buffer) {
        this._reset( );
        this._handleOnLoad(buffer);
    }
    this._onImageDecoded = function (image) {
        var width = image.get_width( );
        var height = image.get_height( );
        this.canvas.width = width;
        this.canvas.height = height;
        this._imageData = this.ctx.createImageData(width, height);
        image.display(this._imageData, function (displayImageData) {
            var itemId =
self._requestContext.itemIds[self._requestContext.currentFrameIndex];
            var payload = self._requestContext.payload;
            if (height > payload.displayHeight) {
                payload.displayHeight = height;
            }
            if (!(itemId in self._requestContext.dependencies)) {
                if (width > payload.displayWidth) {
                    payload.displayWidth = width;
                }
            }
            payload.frames.push({
                canvasFrameData: displayImageData.data,
                itemId: itemId,
                width: width,
                height: height
            });
        }
        self._requestContext.currentFrameIndex+ +;
        if (self._requestContext.currentFrameIndex > =
self._requestContext.itemIds.length) {
                self._requestContext.callback(payload);
                self._isRequestActive = false;
                self.decode( ); // Decode next queued request
            }
        });
    };
    .
    .
    .
    .
    this._createDecodeCanvas(document.documentElement);
    this._reset( );
}
```

The renderer module 125 may render the decoded media and display it on an output device such as a monitor or the like. The renderer module 125 converts video data in a YUV format into video data in a RGB format using Web Graphics Library (WebGL). WebGL is a web-based graphical library that is available through JavaScript and allows the creation of a 3D graphical interface.

Figure 9:
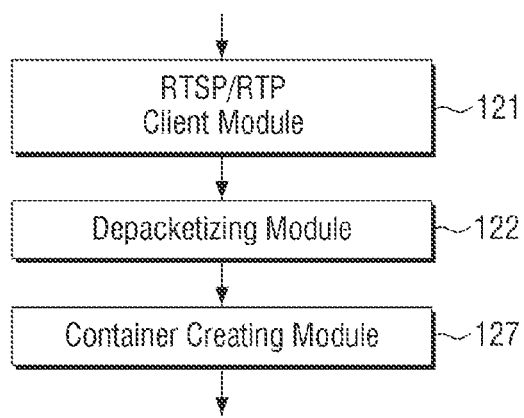
FIG. 9 shows a script module of the module storage unit.

FIG. 9 shows a script module of the module storage unit 115 according to an exemplary embodiment. The script module of FIG. 9 includes the RTSP/RTP client module 121, the depacketizing module 122 and a container creating module 127. Further, in the embodiment of FIG. 9, the script module may be implemented in JavaScript. The RTSP/RTP client module 121 and the depacketizing module 122 are the modules described with reference to FIG. 8, and thus a redundant description will be omitted.

Referring closely to the script module of FIG. 9, it can be seen that it includes the container creating module 127 unlike in FIG. 8. The container creating module 127 may form a container by collecting frames when the video is not packaged on a container basis.

A container may refer to a digital multimedia container format, such as an MPEG-DASH container supported by a video tag. Since the container creating module 127 may configure the video frames in a container format compatible with a video tag, the video tag can be used without a compatibility problem even if the video is not transmitted in the container format from an image capturing device. That is, it provides an environment in which a video tag can be used without modification of an image capturing device installed previously.

The script module described with reference to FIGS. 8 and 9 is transmitted from the media service apparatus 110 to the media playback apparatus 120, and provides an environment in which an operation of playing back media can be performed in the web browser 210 of the media playback apparatus 120 without a plug-in. That is, the script module is installed in the media playback apparatus 120 to configure a system for playing back media. An embodiment of the media playback apparatus 120 having the script module will be described with reference to FIGS. 10 and 12.

Figure 10:
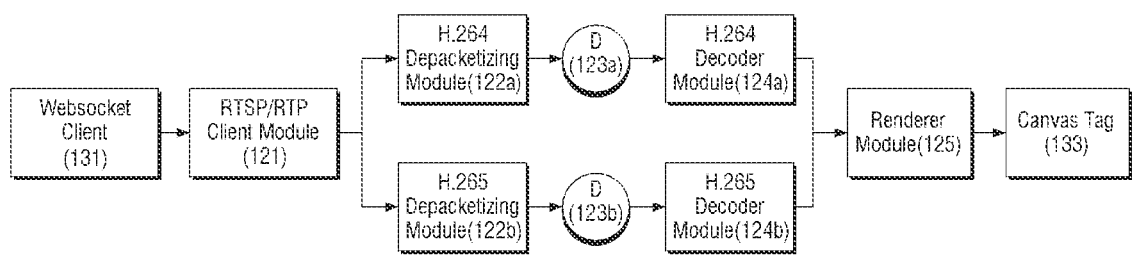
FIG. 10 shows a configuration of the media playback apparatus according to an exemplary embodiment.

FIG. 10 shows a configuration of the media playback apparatus 120 according to an exemplary embodiment.

The media playback apparatus 120 of FIG. 10 includes a WebSocket client 131, the RTSP/RTP client module 121, depacketizing modules 122a and 122b, delay detecting modules 123a and 123b, decoder modules 124a and 124b, the renderer module 125 and a canvas tag 133. In this case, the modules from the RTSP/RTP client module 121 to the renderer module 125 along arrows are modules configured by receiving the script module after the media playback apparatus 120 connects to the media service apparatus 110 via the network 430. The operation of the media playback apparatus 120 of FIG. 10 will be described below.

The WebSocket client 131 may establish a WebSocket connection with the web server 114 of the media service apparatus 110. The media playback apparatus 120 and the media service apparatus 110 send and receive a transmission packet through a handshake between the WebSocket client 131 and the web server 114, respectively.

The RTSP/RTP client module 121 may support RTSP/RTP communication in the user's web browser 210 as described in the embodiment of FIG. 8. Accordingly, the user can play back media through the web browser 210 of the HTML5 environment using the RTSP/RTP protocol without installing a separate plug-in.

The video data from the RTSP/RTP client module 121 is transmitted to a H.264 depacketizing module 122a or H.265 depacketizing module 122b according to the codec format. As can be seen from the name of the module, the H.264 depacketizing module 122a may depacketize the video in the H.264 codec format, and the H.265 depacketizing module 122b may depacketize the video in the H.265 codec format. Even if the codec format is different, since a video playback process is the same, the following description will be made based on the video of the H.264 codec format.

The video depacketized in the H.264 depacketizing module 122a is transmitted to a delay detecting module 123a. The delay detecting module 123a determines a playback delay, and a detailed description thereof will be made with reference to FIG. 11.

Figure 11:
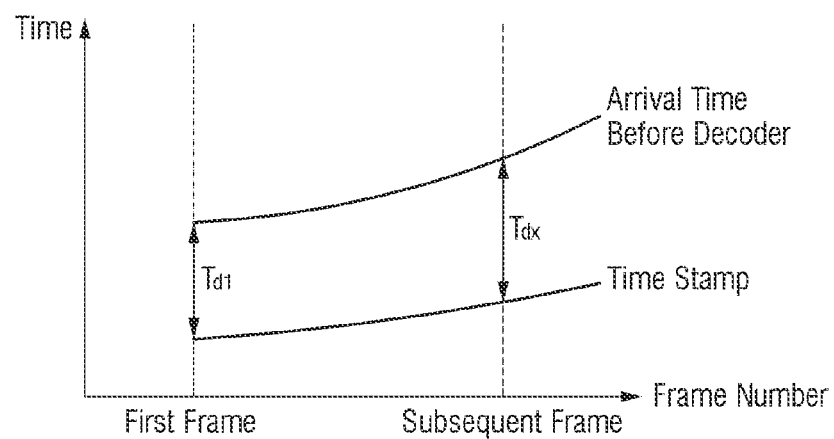
FIG. 11 shows a method of determining a playback delay in a delay detecting module.

FIG. 11 shows a method of determining a playback delay in the delay detecting module.

Here, the playback delay may includes a network delay occurring during data transmission from the media service apparatus 110 to the media playback apparatus 120, a decoding delay occurring in a decoding process in a first media restoring unit 143 of the media playback apparatus 120, and a rendering delay occurring in the renderer module 125.

Delay detection may be performed on a frame-by-frame basis before a decoder module 124a. The delay detecting module 123a determines whether or not a delay occurs using the time at which a frame arrives at the decoder module 124a and the time stamp of the frame. The time stamp may indicate the time when the frame is generated or transmitted from the media service apparatus 110. Hereinafter, a delay detection method will be described in detail.

First, a first frame, which is a frame having arrived at the decoder module 124a for the first time, will be described. When the time when the first frame arrives at the decoder module 124a is Ta1 and the time stamp of the first frame is Tf1, Td1, which is a time difference between Ta1 and Tf1, is calculated. Td1 is a reference value for determining a playback delay.

$$T_{d1}=|T_{f1}-T_{a1}|$$

Next, the time at which a subsequent frame, which is an arbitrary frame after the first frame, arrives at the decoder module 124a while playback is in progress is referred to as Tax, and the time stamp of the subsequent frame is referred to as Tfx. Tdx, which is a time difference between Tax and Tfx, is calculated.

$$T_{dx}=|T_{fx}-T_{ax}|$$

The delay detection is determined by comparing Tdx and Td1. As a determination method, it may be determined that playback is delayed if a difference between the values of Tdx and Td1 exceeds a preset maximum delay time Td_max. The maximum delay time may be initially set to an arbitrary value set by the user, and then changed to have an optimum value automatically according to learning.

The above-described delay detection method will be described using an example. When the time at which the first frame arrives at the decoder module 124a is 4 seconds (e.g., 00:00:04) and the time stamp of the first frame is 1 second (e.g., 00:00:01), Td1 is 3 seconds which is a difference between the two values. When the time at which an arbitrary subsequent frame arrives at the decoder module 124a while playback is in progress is 10 seconds (e.g., 00:00:10) and the time stamp of the subsequent frame is 6 seconds (e.g., 00:00:06), Tdx becomes 4 seconds which is a difference between the two values. When the preset allowable Td_max is 5 seconds, a difference between Tdx and Td1 is 4 seconds−3 seconds, i.e., 1 second, which does not exceed Td_max (5 seconds). Therefore, it is determined that a playback delay does not occur.

As another determination method, a playback delay may be detected on the basis of whether a difference between the values of Tdx and Td1 exceeds the maximum delay time over a predetermined number of times. Accordingly, it may be possible to prevent even a case where a playback delay temporarily occurs for a short time from being determined as a playback delay. For example, when Td1 and Td_max are 3 and 5 seconds, respectively, as in the example described above and the values of Tdx are 4, 9, 6, and 6 seconds in the subsequent four frames, the differences between Tdx and Td1 are 1 second, 6 seconds, 3 seconds and 3 seconds. When the predetermined number of times is set to 3 times, since a case where the difference between Tdx and Td1 exceeds Td_max is a case of 6 seconds, which occurs one time, it is determined that a playback delay does not occur.

When delay detection is performed before the decoder by the above-described method, it may be possible to determine a delay due to the network, decoding and rendering by a single measurement. This is because of the single-threaded nature of JavaScript. Since the decoder module 124*a* implemented in JavaScript operates as a single thread, it may not accept the next frame before processing the current frame. Therefore, if delay detection is performed before the decoder module 124*a*, a decoding delay and a rendering delay as well as a network delay can be detected.

The media playback apparatus 120 may perform a receiving process in the receiving unit, a decoding process in the first media restoring unit 143 and a rendering process in the renderer by using a web worker performing a multi-thread function. Even in this case, the delay detection method is still valid since each process is composed of one pipeline.

By using the delay detection method of FIG. 11, it is possible to determine a delay due to the network, decoding and rendering by a single measurement. Therefore, it is possible to determine the playback delay much more easily than a conventional method in which a network delay, a decoding delay and a rendering delay must be individually measured. Accordingly, by using the delay detection method as described above, it is possible to simply and stably perform media playback in a manner suitable for a non-plug-in environment.

Referring back to FIG. 10, the H.264 decoder module 124*a* along an arrow from the delay detecting module 123*a* will be described. The H.264 decoder module 124*a* may decode video in the H.264 codec format. In the H.264 decoder module 124*a*, decoding is performed on a frame-by-frame basis of video.

Meanwhile, the H.265 decoder module 124*b*, which is another module that performs decoding, may decode video in the H.265 codec format. Although only the H.254 and H.265 codec formats are exemplified in the media playback apparatus 120 of FIG. 10, it may be possible to implement a decoder in JavaScript without depending on the codec format of the video. Therefore, it is also possible to perform decoding in other codec formats.

In the case of the H.264 decoder module 124*a*, the video decoded by the H.264 decoder module 124*a* is displayed on the web browser through the renderer module 125 and the canvas tag 133. The canvas tag 133 is an element of HTML5 that allows 2D shapes and bitmap images to be dynamically rendered. That is, it can be regarded as a paint program on the web browser. Since it is a function supported by most of the latest versions of web browsers, the video may be processed on a frame-by-frame basis by the decoder implemented in JavaScript and displayed on the web browser by using the canvas tag 133.

Figure 12:
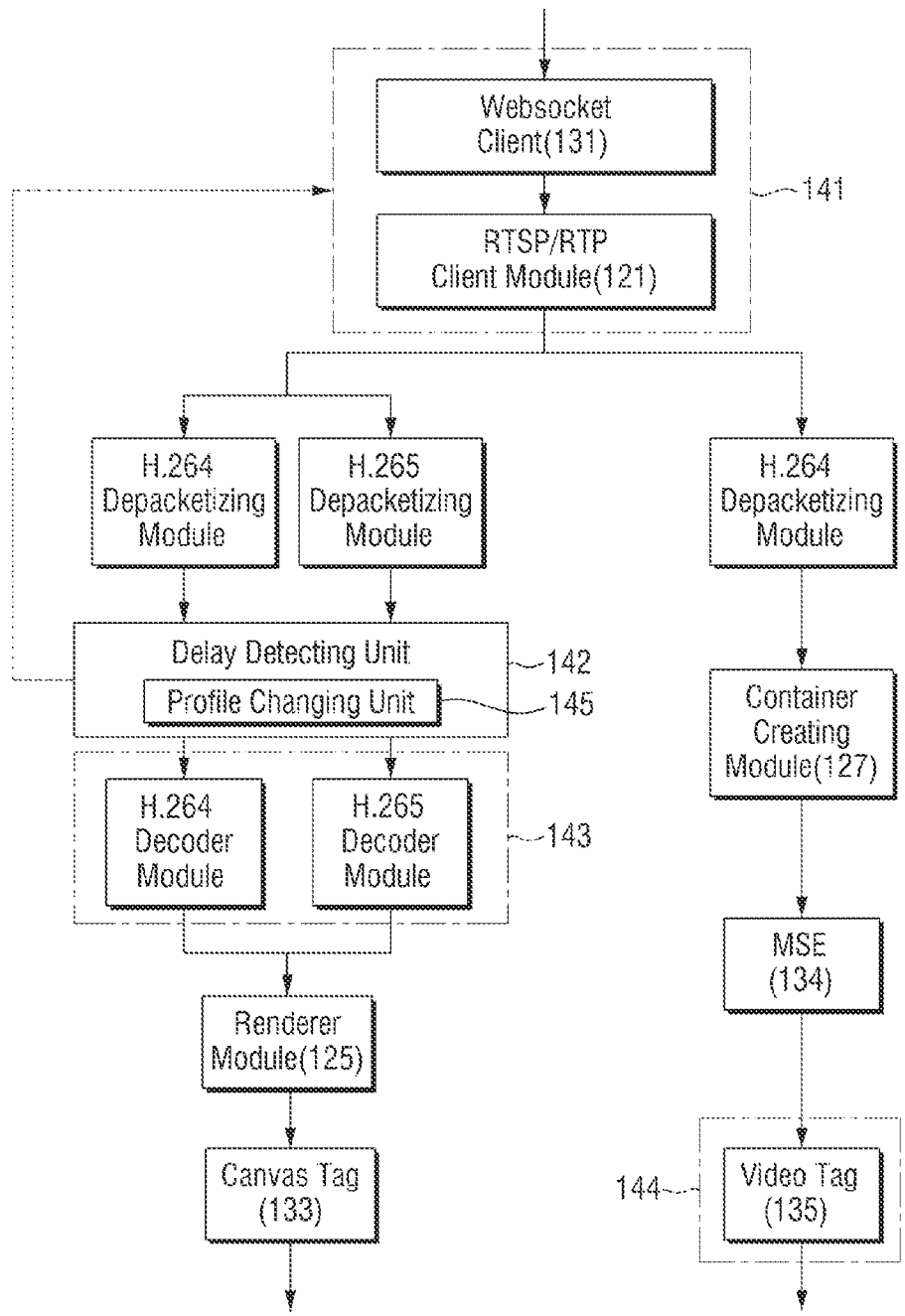
FIG. 12 shows a configuration of the media playback apparatus according to another exemplary embodiment.

FIG. 12 illustrates a configuration of the media playback apparatus 120 according to another exemplary embodiment.

In FIG. 12, the RTSP/RTP client module 121 to the renderer module 125 along left downward arrows are modules configured by receiving the script module of FIG. 8 from the media service apparatus 110, and the RTSP/RTP client module 121 to the container creating module 127 along right downward arrows are modules configured by receiving the script module of FIG. 9. In the embodiment of FIG. 12, description will be made focusing on an operation process of the media playback apparatus 120 and a delay eliminating method when a playback delay is determined. In this case, the media to be played back is video in the codec format of H.264 or H.265.

A receiving unit 141 constituted by the WebSocket client 131 and the RTSP/RTP client module 121 receives video from the media service apparatus 110 using an RTSP/RTP protocol transmitted over a WebSocket.

The video received through the receiving unit 141 is transmitted to a different module depending on whether the video is decoded by a first media restoring unit 143 or a second media restoring unit 144. The first media restoring unit 143 is configured to perform decoding by the decoder module 124 of the script module. That is, it is configured to perform decoding on a frame-by-frame basis by a decoder implemented by a script that can be parsed by a web browser. The second media restoring unit 144 is configured to perform decoding by a decoder embedded in the web browser. It may be determined which media restoring unit performs decoding based on, for example, whether the video is video in a codec format supported by a decoder embedded in a web browser, or high resolution video. The determination criterion is described later with reference to FIG. 13.

First, a case where decoding is performed by the first media restoring unit 143 will be described.

The video transmitted from the receiving unit 141 is depacketized in an appropriate depacketizing module according to the codec format. The depacketized video is transmitted to a delay detecting unit 142 on a frame-by-frame basis. The delay detecting unit 142 includes the delay detecting module 123 of the script module and determines whether or not a playback delay of the media occurs by using the delay detection method described with reference to FIG. 11.

When a delay is detected in the delay detecting unit 142, an operation for requesting media data with a changed profile from the media service apparatus 110 is performed by a profile changing unit. That is, if the delay detecting unit 142 detects a playback delay, the profile changing unit receives a signal indicating that playback is delayed from the delay detecting unit 142, and requests media data of the changed profile from the media service apparatus 110.

Referring closely to FIG. 12, an arrow is drawn with a dotted line from the delay detecting unit 142 to the receiving unit 141. This indicates that feedback is sent by the profile changing unit to request the media service apparatus 110 to change the profile of the media data. The delay detecting unit 142 may generate and transmit a media profile change request when the delay detecting unit 142 detects a playback delay. The media profile change request may be sent to the media service apparatus 110 through the receiving unit 141 as described above and may be performed by forming a separate channel directly in the profile changing unit.

The playback delay can be eliminated by changing the profile of the media. By changing the profile of the media to reduce the weight of the media, transmission, decoding and rendering in the network can be made lighter.

In this case, the profile of the media includes a resolution, a frame rate, and a bit rate. The resolution refers to the number of pixels constituting an image and is usually expressed in the form of width×length. The unit of the frame rate is frames per second (fps), which means the number of images played back in one second. The unit of the bit rate is bits per second (bps), which means the size of data constituting one second of video.

The profile of the media may be provided in a plurality of levels set in advance, and the plurality of levels may be configured such that all of the profile elements of the media are varied or at least one of the profile elements is varied. For example, a plurality of levels may be configured such that all of the resolution, the frame rate, and the bit rate are varied, or only the resolution of the media is changed. The plurality of levels may include a higher resolution, a higher frame rate, or a higher bit rate in a higher level, and a lower resolution, a lower frame rate, or a lower bit rate in a lower level.

The profile change of the media data may refer to a change from a current profile to a lower level, or a higher level profile. For example, it may be a profile change that increases or decreases the resolution of the media to a higher level or a lower level and maintains the aspect ratio, or may be a change that increases or decreases all of the resolution, the frame rate and the bit rate to higher or lower levels.

The plurality of levels of the media profile may be configured, for example, as shown in Table 3 below. Assuming that the current profile has a resolution of 1280×720, a frame rate of 20 fps and a bit rate of 2 Mbps, the profile change according to a plurality of levels is performed as follows. In the case of a change to a higher level, all of the resolution, the frame rate, and the bit rate are increased, and it is changed to a profile having a resolution of 1920×1080, a frame rate of 30 fps, and a bit rate of 2.5 Mbps. In the case of a change to a lower level, only the bit rate is decreased to 1 Mbps.

TABLE 3

| Resolution | Frame rate | Bit rate |
| --- | --- | --- |
| 2704 × 1520 | 30 fps | 4 Mbps |
| 1920 × 1080 | 30 fps | 2.5 Mbps |
| 1280 × 720 | 20 fps | 2 Mbps |
| 1280 × 720 | 20 fps | 1 Mbps |

The delay detecting unit 142 can continuously detect a playback delay even after the profile of the media is changed. In this case, the first frame serving as a reference for playback delay detection becomes the first frame of the media data whose profile has been changed, and a playback delay is detected by repeating the delay detection method described with reference to FIG. 11.

If the delay detecting unit 142 determines that media playback is still delayed even after the profile is changed, the profile changing unit may request the media service apparatus 110 to transmit the media data with a profile in a lower level than that of the changed profile.

On the contrary, if a difference between Tdx and Td1 detected by the delay detecting unit 142 after the profile is changed is equal to or less than a reference value and lasts for a predetermined reference time or more, it can be considered that media playback is performed smoothly. Accordingly, the profile changing unit may request the media service apparatus 110 to transmit the media data with a profile in a higher level than that of the changed profile. In this case, the reference value may be a maximum delay time or a value smaller than the value set by the user, and the reference time is a minimum duration for preventing the profile from being changed due to temporary noise.

The video frame having the profile which has been changed or retained through the delay determination process is decoded by the first media restoring unit 143. In the exemplary embodiment of FIG. 12, the first media restoring unit 143 is configured such that a decoder is implemented in JavaScript, which is a script that can be parsed by a web browser, and the video is decoded on a frame-by-frame basis in a JavaScript decoder. The decoded video is displayed on the web browser via the renderer module 125 and the canvas tag 133.

Next, a case where decoding is performed by the second media restoring unit 144 will be described.

The receiving unit 141 transmits the video to the depacketizing module along a right arrow. The video that has been depacketized in the depacketizing module is transmitted to the container creating module 127.

As described with reference to FIG. 9, the container creating module 127 collects frames to create a container when the video is not transmitted in a container format. The video that has passed through the container creating module 127 is transmitted to the MSE 134 and the second media restoring unit 144 without a compatibility problem due to the container format.

The MSE 134 is a JavaScript API for HTML5, which is created for video streaming playback using HTTP download. This technology, standardized by the World Wide Web Consortium (W3C), enables streaming playback on a game console such as Xbox and PlayStation 4 (PS4) or Chromecast browser.

In FIG. 12, the second media restoring unit 144 includes a video tag module 135 which is a decoder embedded in a web browser. The video tag module 135 performs decoding and rendering so that video is displayed on a web browser. The video tag module 135 may be also referred to as a video tag player.

By using a decoder which is the video tag module 135 of the second media restoring unit 144, decoding can be performed with better performance than the decoder module 124 having the limitation due to the dynamic language characteristic of JavaScript. That is, high resolution images and decoding of high frames per second (fps) can be achieved.

Although it is illustrated in FIG. 12 that the delay detecting unit 142 is provided only in the first media restoring unit 143, the media playback apparatus 120 may be configured such that the delay detecting unit 142 is also provided before the decoder of the second media restoring unit 144 to detect a playback delay due to the decoder of the second media restoring unit 144 and prevent a delay by requesting media whose profile has been changed when a playback delay is detected.

Figure 13:
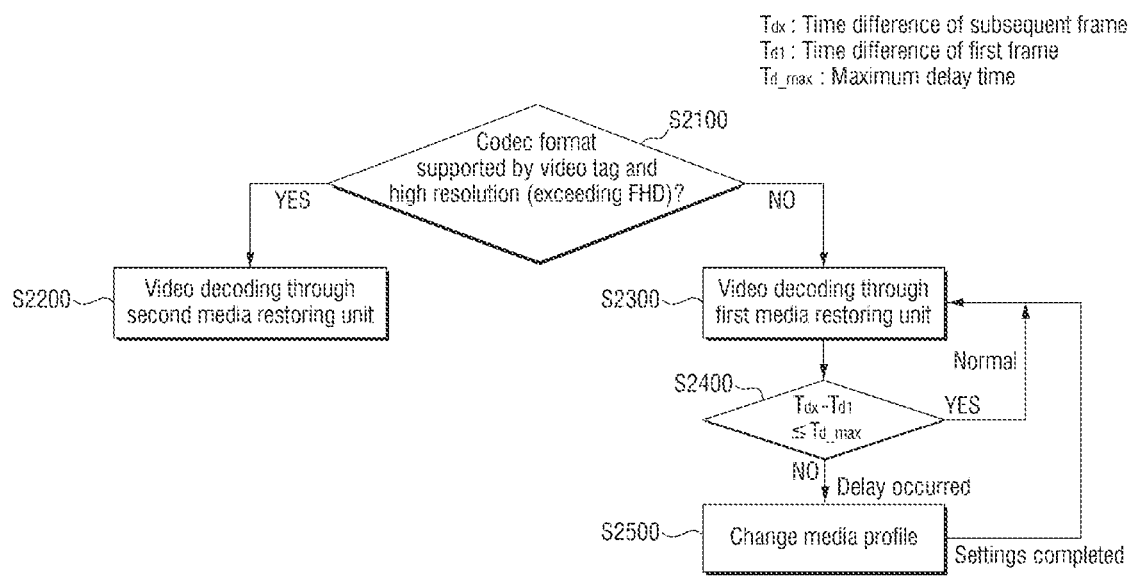
FIG. 13 is a flowchart showing an operation process of the media playback apparatus.

FIG. 13 is a flowchart showing an operation process of the media playback apparatus 120 according to an exemplary embodiment. More specifically, FIG. 13 shows an operation process of the media playback apparatus 120 of the embodiment of FIG. 12.

It is determined whether the video transmitted to the media playback apparatus 120 has a codec format supported by the video tag and a high resolution (exceeding full high definition (FED)) (operation S2100). If both of the above conditions are satisfied, since it is suitable for decoding using a video tag having excellent performance, decoding is performed through the second media restoring unit 144 (operation S2200). In the case where one of the two conditions is not satisfied, it has a codec format not supported by a video tag, or it is not a high resolution video even if it has a codec format supported by a video tag. In this case, the video is decoded through the first media restoring unit 143 implemented in JavaScript (operation S2300). Thereafter, it is determined whether a delay occurs while video playback is in progress (operation S2400). If a playback delay does not occur, video decoding is continuously performed through the first media restoring unit 143 without changing the profile (operation S2300). However, if it is determined that a playback delay has occurred, the profile is changed (operation S2500) and video decoding is performed through the first media restoring unit 143 (operation S2300).

Figure 14:
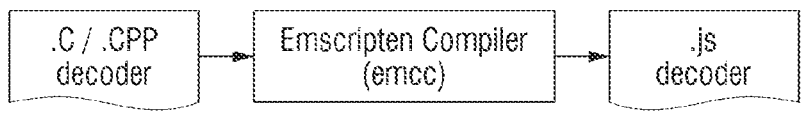
FIG. 14 is an exemplary diagram explaining a process of generating a script module implemented in JavaScript according to an exemplary embodiment.

FIG. 14 illustrates a process of generating a script module implemented in JavaScript according to an exemplary embodiment. Referring to FIG. 14, a script module implemented in JavaScript may be implemented by converting a source written in the conventional C and C++ native code using a converter such as Emscripten to obtain JavaScript code that can be used in a browser.

When using a converter such as Emscripten, it is possible to obtain a decoder or a container implemented in JavaScript from conventional native code. Accordingly, there is an advantage that codec dependency can be lowered.

Since JavaScript code is used instead of a plug-in, it is unnecessary to worry about a browser's support interruption. In addition, there is no need to worry about whether to use the ActiveX interface or the NPAPI interface depending on the browser. That is, there is an advantage that the dependency on the browser can be lowered.

Figure 15:
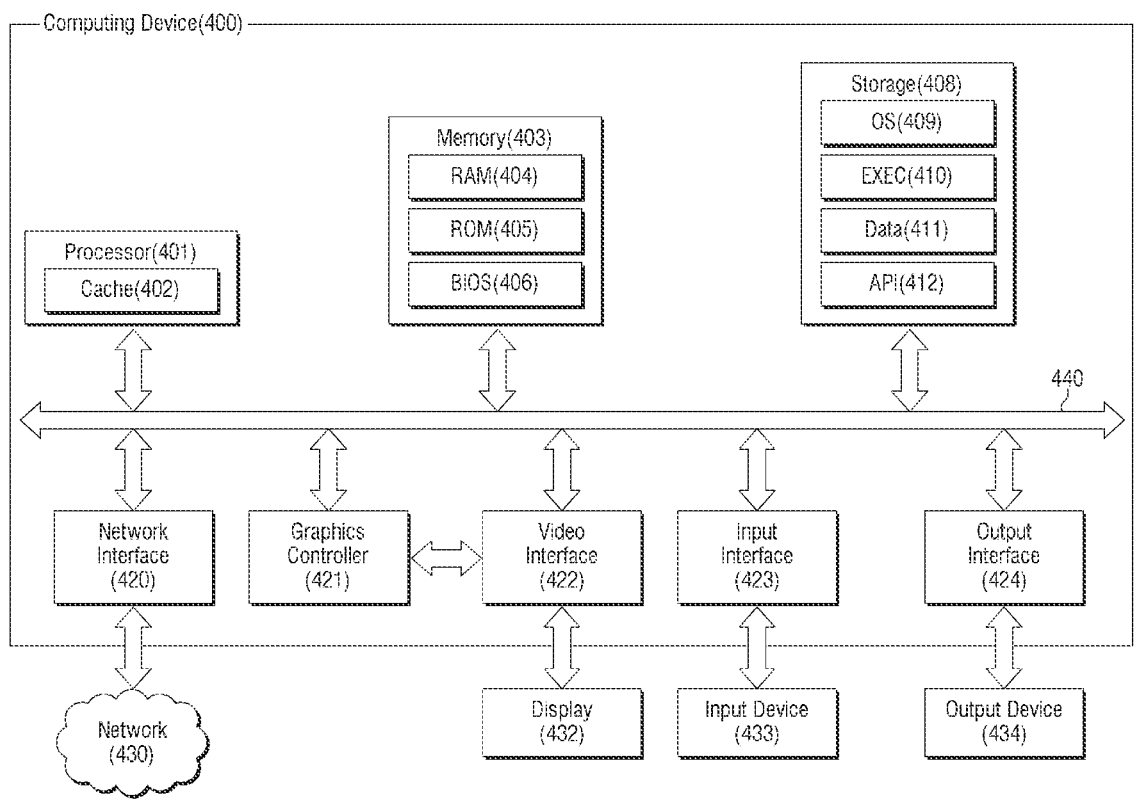
FIG. 15 is an exemplary diagram of a computing device for implementing the media playback apparatus.

The media playback apparatus 120 shown in FIG. 1 may be implemented, for example, as a computing device 400 shown in FIG. 15. The computing device 400 may be, but is not limited to, mobile handheld devices (e.g., smart phones, tablet computers, etc.), laptop or notebook computers, distributed computer systems, computing grids or servers. The computing device 400 may include a processor 401, a memory 403 and a storage 408 that communicate with each other or with other elements via a bus 440. The bus 440 may be connected to a display 432, at least one input device 433, and at least one output device 434.

All of these elements may be connected to the bus 440 directly or via one or more interfaces or adapters. The bus 440 is connected to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is a local storage for temporarily storing instructions, data, or computer addresses. The processor 401 executes instructions (or software modules) stored in a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, and a combination thereof. Further, a basic input/output system (BIOS) (e.g., firmware) having basic routines necessary for booting the computing device 400 may be included in the memory 403.

The storage 408 is used to store an operating system 409, executable files (EXEC) 410, data 411, API 412, and the like. The storage 408 may be a hard disk drive, an optical disk drive, a solid-state drive (SSD), and the like.

The computing device 400 may include the input device 433. The user may enter commands and/or information into the computing device 400 via the input device 433. Examples of the input device 433 may include a keyboard, a mouse, a touch pad, a joystick, a game controller, a microphone, an optical scanner, and a camera. The input device 433 may be connected to the bus 440 via an input interface 423 including a serial port, a parallel port, a game port, a Universal Serial Bus (USB), and the like.

In some embodiments, the computing device 400 is connected to the network 430. The computing device 400 is connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a modem and the like. Examples of the network 430 may include the Internet, a wide area network (WAN), a local area network (LAN), a telephone network, a direct connection communication and the like, and a wired and/or wireless communication scheme may be employed.

The execution result of the software module by the processor 401 may be displayed through the display 432. Examples of the display 432 may include a liquid crystal display (LCD), an organic light-emitting display (OLED), a cathode ray tube (CRT), and a plasma display panel (PDP). The display 432 is connected to the bus 440 via a video interface 422 and the data transfer between the display 432 and the bus 440 can be controlled by a graphics controller 421.

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, or the like.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A media service apparatus for transmitting media data to a media playback apparatus, the media service apparatus comprising:
    a memory configured to store a script module to play back the media data on a web browser of the media playback apparatus; and
    at least one processor comprises:
    a module transmitting unit configured to transmit the script module to the media playback apparatus in response to a connection between the media service apparatus and the media playback apparatus being established;
    a packetizing unit configured to packetize the media data to generate a transmission packet; and a web server configured to establish the connection and transmit the transmission packet to the media playback apparatus in response to a requested profile being received from the media playback apparatus, wherein the script module comprises a decoding module configured to operate within a single-threaded code and decode the media data without a plug-in in the media playback apparatus, and a delay detection module configured to detect a playback delay including a network delay, a decoding delay and a rendering delay on a frame-by-frame basis by a single measurement of the playback delay, before the decoding module decodes the media data, and wherein the network delay occurs during transmission of the media data from the media service apparatus to the media playback apparatus, the decoding delay occurs in a decoding process of the media playback apparatus, and the rendering delay occurs in a rendering process of the media playback apparatus.

2. The media service apparatus of claim 1, wherein the script module is written in Javascript which is configured to be parsed by the web browser.

3. The media service apparatus of claim 1, wherein the script module is further configured to detect the playback delay based on a first difference between a time at which the media data arrive at the decoding module for decoding the media data without the plug-in in the media playback apparatus and a time stamp of the media data.

4. The media service apparatus of claim 3, wherein the script module is further configured to detect the playback delay by comparing a second difference between a time at which a first frame of the media data arrives at the decoding module and a time stamp of the first frame with a difference between a time at which a subsequent frame of the media data arrives at the decoding module and a time stamp of the subsequent frame.

5. The media service apparatus of claim 4, wherein the first frame includes a first frame included in the media data and a first frame of the media data that has a changed profile.

6. The media service apparatus of claim 4, wherein the script module is further configured to detect the playback delay based on a determination of whether the second difference exceeds a predetermined time.

7. The media service apparatus of claim 1, wherein, based on the script module detecting the playback delay, the at least one processor is further configured to change a bit rate of the media data included in a profile of the media data.

8. The media service apparatus of claim 4, wherein the script module is further configured to decode the media data by another decoding module embedded in the web browser.

9. The media service apparatus of claim 8, wherein the another decoding module embedded in the web browser is a video tag module supported by HTML5.

10. The media service apparatus of claim 5, wherein the changed profile has a lower level than a level of a current profile among a plurality of levels of profiles.

11. The media service apparatus of claim 5, wherein in response to detecting the playback delay of the media data after the changed profile is requested, the media playback apparatus requests the media service apparatus to transmit the media data having a profile that has a lower level than a level of the changed profile.

12. The media service apparatus of claim 5, wherein in response to the playback delay of the media data, which is detected after the changed profile is requested, being less than or equal to a predetermined reference value and lasting for a predetermined reference time or longer, and wherein the media playback apparatus requests the media service apparatus to transmit the media data with a profile that has a higher level than a level of the changed profile.

* * * * *